(12) United States Patent
Peterson et al.

(10) Patent No.: US 11,243,885 B1
(45) Date of Patent: Feb. 8, 2022

(54) PROVIDING TRACK ACCESS REASONS FOR TRACK ACCESSES RESULTING IN THE RELEASE OF PREFETCHED CACHE RESOURCES FOR THE TRACK

(71) Applicant: INTERNATIONAL BUSINESS MACHINES CORPORATION, Armonk, NY (US)

(72) Inventors: Beth Ann Peterson, Tucson, AZ (US); Chung Man Fung, San Francisco, CA (US); Matthew J. Kalos, Tucson, AZ (US); Warren Keith Stanley, Loveland, CO (US); Matthew J. Ward, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/985,216

(22) Filed: Aug. 4, 2020

(51) Int. Cl.
*G06F 12/00* (2006.01)
*G06F 12/0862* (2016.01)
(Continued)

(52) U.S. Cl.
CPC ...... *G06F 12/0862* (2013.01); *G06F 9/30047* (2013.01); *G06F 12/0246* (2013.01); *G06F 12/0815* (2013.01); *G06F 12/0891* (2013.01); *G06F 13/20* (2013.01); *G06F 2212/1021* (2013.01); *G06F 2212/462* (2013.01); *G06F 2213/0026* (2013.01)

(58) Field of Classification Search
CPC ............. G06F 12/0862; G06F 9/30047; G06F 12/0246; G06F 12/0815; G06F 12/0891; G06F 13/20; G06F 2212/1021; G06F 2212/462; G06F 2213/0026
See application file for complete search history.

(56) References Cited

U.S. PATENT DOCUMENTS 8,190,832 B2   5/2012  Dickey et al.
8,595,455 B2  11/2013  Chatterjee et al.
(Continued)

FOREIGN PATENT DOCUMENTS

CN    110275841 A    9/2019
CN    111176576 A    5/2020

OTHER PUBLICATIONS

B. Dufrasne, et al., "IBM DS8880 and IBM Z Synergy", IBM Redbooks, Document REDP-5186-03, Apr. 2019, pp. 132.
(Continued)

*Primary Examiner* — Gurtej Bansal
(74) *Attorney, Agent, or Firm* — Konrad Raynes Davda & Victor LLP; David W. Victor

(57) ABSTRACT

Provided are a computer program product, system, and method for providing track access reasons for track accesses resulting in the release of prefetched cache resources for the track. A first request for a track is received from a process for which prefetched cache resources to a cache are held for a second request for the track that is expected. A track access reason is provided for the first request specifying a reason for the first request. The prefetched cache resources are released before the second request to the track is received. Indication is made in an unexpected released track list of the track and the track access reason for the first request.

20 Claims, 5 Drawing Sheets

(51) Int. Cl.
*G06F 12/0815* (2016.01)
*G06F 12/0891* (2016.01)
*G06F 12/02* (2006.01)
*G06F 13/20* (2006.01)
*G06F 9/30* (2018.01)

(56) References Cited

U.S. PATENT DOCUMENTS

| | | | |
|---|---|---|---|
| 9,336,047 | B2 | 5/2016 | Busaba et al. |
| 9,372,751 | B2 | 6/2016 | McNutt |
| 9,671,975 | B2 | 6/2017 | Perez et al. |
| 9,715,352 | B2 | 7/2017 | Craddock et al. |
| 10,152,419 | B2 | 12/2018 | Gschwind et al. |
| 10,528,474 | B2 | 1/2020 | Bretschneider et al. |
| 10,691,566 | B2 | 6/2020 | Anderson et al. |
| 2013/0024626 | A1* | 1/2013 | Benhase ............ G06F 12/0862 711/137 |
| 2019/0050157 | A1 | 2/2019 | Anderson et al. |
| 2019/0065381 | A1 | 2/2019 | Anderson et al. |
| 2019/0073310 | A1 | 3/2019 | Bretschneider et al. |
| 2020/0042453 | A1 | 2/2020 | Bretschneider et al. |
| 2020/0050384 | A1 | 2/2020 | Gupta et al. |
| 2020/0174680 | A1 | 6/2020 | Peterson et al. |
| 2020/0174691 | A1 | 6/2020 | Peterson et al. |

OTHER PUBLICATIONS

U.S. Appl. No. 16/985,215, filed Aug. 4, 2020.
PCT International Search Report and Written Opinion dated Sep. 28, 2021, pp. 9, for Application Serial No. PCTCN2021/104276.
Office Action dated Oct. 21, 2021, pp. 15, for U.S. Appl. No. 16/985,215.
PCT International Search Report and Written Opinion dated Nov. 1, 2021, pp. 7, for Application No. PCT/IB2021/056809.

* cited by examiner

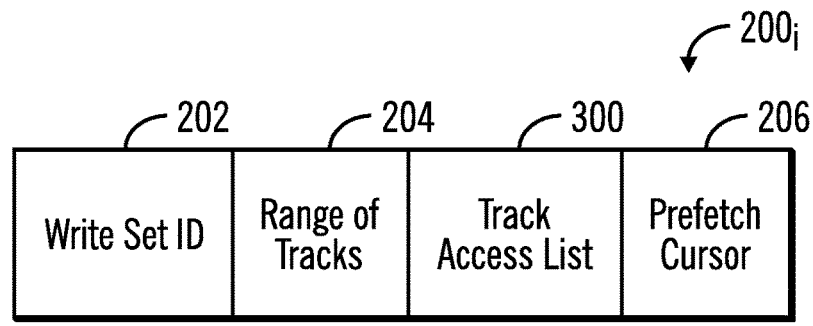
Write Set Info
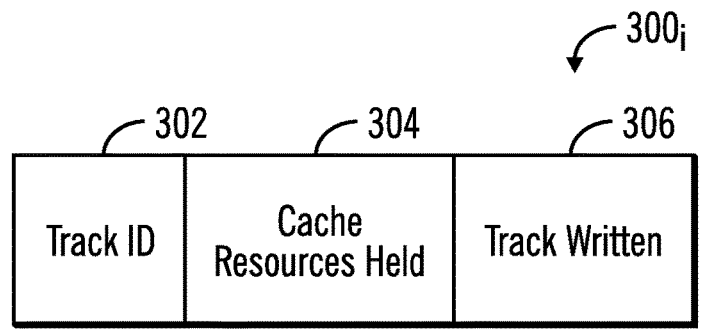
Track Access List Entry
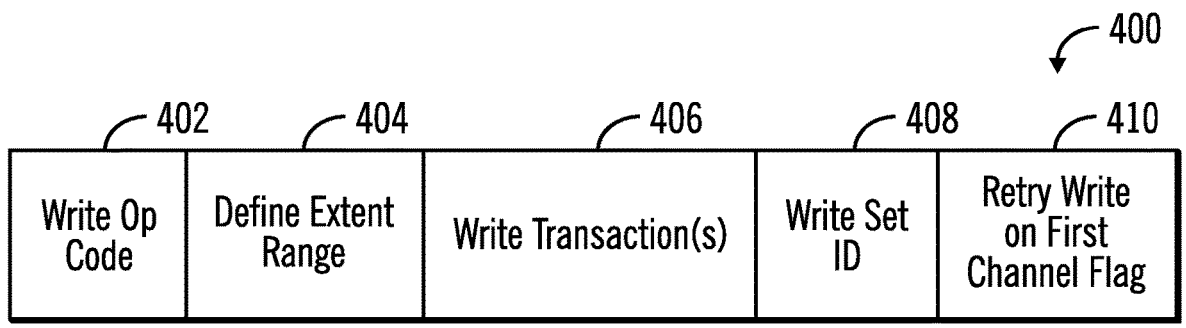
Second Channel Write Request
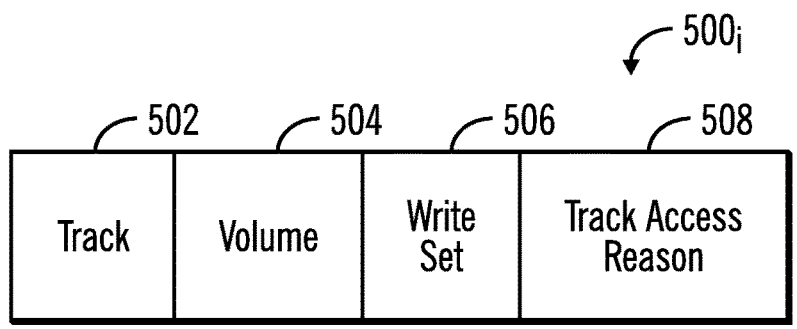
Unexpected Released Track List Entry

PROVIDING TRACK ACCESS REASONS FOR TRACK ACCESSES RESULTING IN THE RELEASE OF PREFETCHED CACHE RESOURCES FOR THE TRACK

BACKGROUND OF THE INVENTION

1. Field of the Invention

The present invention relates to a computer program product, system, and method for providing track access reasons for track accesses resulting in the release of prefetched cache resources for the track.

2. Description of the Related Art

In a storage environment, a host system may first communicate a read/write request to a connected storage system over a fast channel, such as a bus interface, or Peripheral Component Interconnect Express (PCIe) interface. For a read/write request over the fast channel, which is supposed to complete within a threshold time, the host system holds the application thread for the read/write request in a spin loop waiting for the request to complete. This saves processor time associated with a context swap, which deactivates the thread and reactivates the thread in response to an interrupt when a response to the read/write request is received. If the data for the read/write request sent on the fast channel is not in cache, then the storage system may fail the read/write request and the host system may communicate the same read/write request over a storage area network via a host adaptor, which is slower than processing the I/O request over the bus, e.g., PCIe interface. Communicating the read/write request over the second channel requires the host system to perform a context switch from the task handling the read/write request to another task while waiting for the read/write request to complete. Context switching is costly because it requires the processor running the task to clear all registers and L1 and L2 caches for the new task, and then when completing the new task, reactivate the context switched task and return the state data to the registers and L1 and L2 caches for the task that was context switched while waiting for the read/write request to complete.

Certain read/write operations need to be completed within a threshold time, else they are failed. To process a read or write request, the storage system will have to allocate cache resources, including resources and segments in cache storage and access track metadata to process the read or write request. The track metadata provides information on the format of data and layout of records in the track that are needed in order to perform reads and writes to the track. However, the allocation of cache resources, including accessing of metadata, from the storage comprises a substantial portion of the latency in processing read/write requests.

There is a need in the art for improved techniques for managing host write requests to the cache on the fast channel to improve the likelihood that prefetched cache resources for tracks will be available for the expected write requests received on the fast channel.

SUMMARY

Provided are a computer program product, system, and method for providing track access reasons for track accesses resulting in the release of prefetched cache resources for the track. A first request for a track is received from a process for which prefetched cache resources to a cache are held for a second request for the track that is expected. A track access reason is provided for the first request specifying a reason for the first request. The prefetched cache resources are released before the second request to the track is received. Indication is made in an unexpected released track list of the track and the track access reason for the first request.

BRIEF DESCRIPTION OF THE DRAWINGS

FIG. 2 illustrates an embodiment of write set information for an established write set.

FIG. 3 illustrates an embodiment of a track access list entry in a track access list.

FIG. 4 illustrates an embodiment of a second channel write request sent on the second channel to retry a write request that failed on a first channel.

FIG. 5 illustrates an embodiment of an unexpected released track list entry providing a track access reason for an access request to a track resulting in the release of prefetched cache resources for the track.

DETAILED DESCRIPTION

Access to a write set may be quiesced if there is an event that will prevent write access to the tracks for an extended period of time to allow other processes to access the tracks held for the write set, such as volume ineligibility due to long busy or unsupported copy services state or other processes. Quiescing access to tracks in a write set causes a release of prefetched cache resources for the tracks in the write set. Releasing the prefetched cache resources will cause failure for first channel write requests to retry writing to the tracks in the quiesced write set if there are no cache resources pre-allocated for these write requests when the requests are received.

Prefetching cache resources in advance of the access request increases the likelihood that write requests sent by the host on a first fast channel are completed within a required threshold time for processing access requests on the first channel requiring fast processing. This keeps the time the host thread is spinning on the write request task for the write request sent on the bus interface within an acceptable time threshold. However, if the cache resources for a requested target track have not been allocated in advance of the request, it is unlikely the write request can complete within the threshold time given that the cache resources will have to be allocated. Failing the write request on the first channel causes the host to redrive the write request on the second channel. The processing of the write request on the second channel allocates the required cache resources when processing the write request on the second channel.

Described embodiments provide improvements to computer technology for processing a fail to an access request to a track for which prefetched cache resources are not available by providing track access reasons for processes that requested access to the track that resulted in the release of the prefetched cache resources for the track. The host and other processes may use the track access reasons to determine how to continue processing write requesting for tracks or to perform other troubleshooting and debugging operations on why other processes are requesting access to tracks for which prefetched cache resources are held for fast first channel writes.

Figure 1:
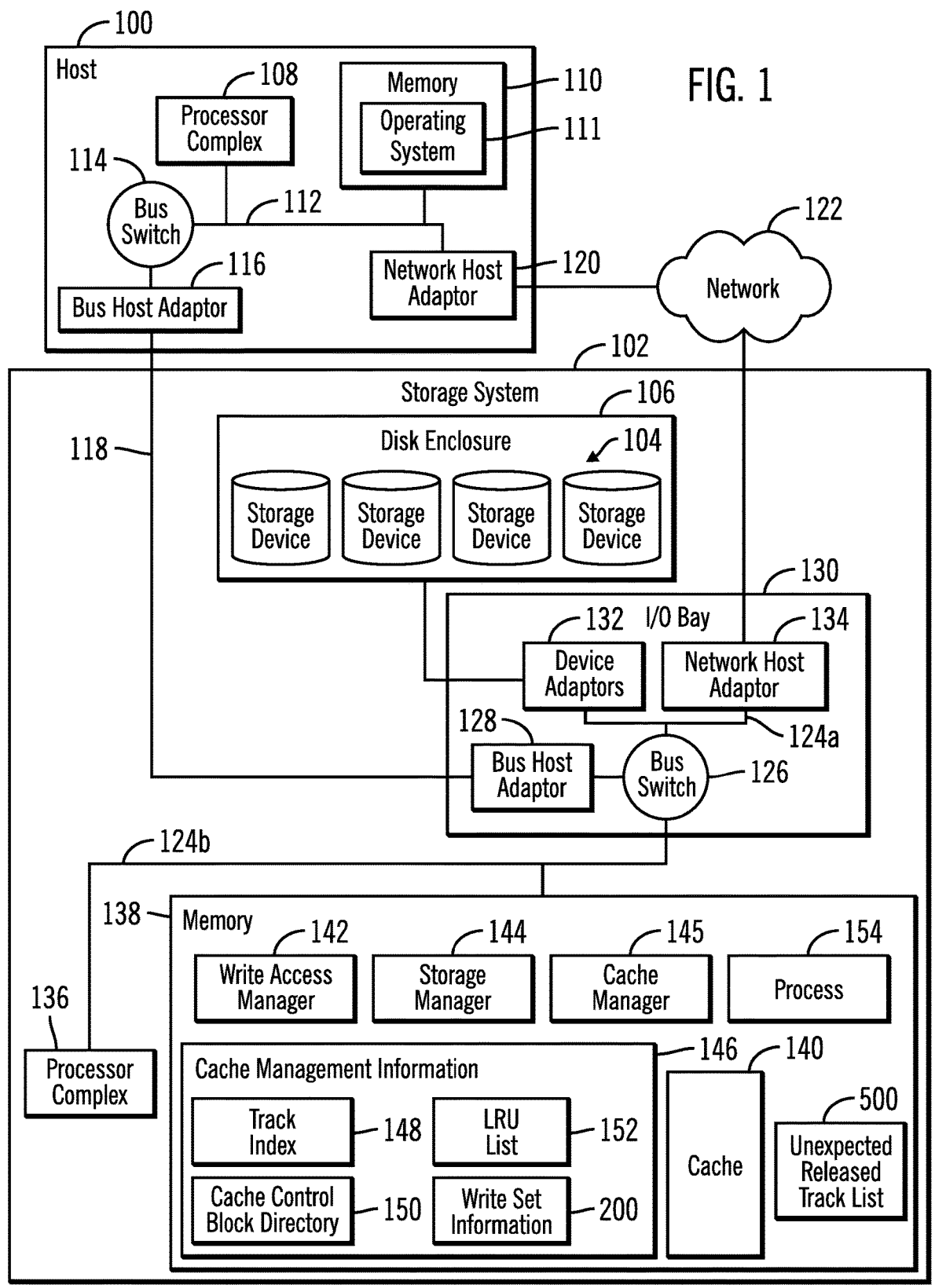
FIG. 1 illustrates an embodiment of a storage environment.

FIG. 1 illustrates an embodiment of a storage environment in which a host 100 directs read and write requests to a storage system 102, also referred to as a storage controller, control unit, server, to access tracks in volumes configured in storage devices 104 in a disk enclosure 106. The host 100 includes a processor complex 108 of one or more processor devices and a memory 110 including an operating system 111 executed by the processor complex 108. The host operating system 111 generates read and write requests to tracks configured in the storage devices 104. The host 100 includes hardware to communicate read and write requests on two different channels. A "first channel" may comprise a bus interface, such as a Peripheral Component Interconnect Express (PCIe), including a bus 112, a bus switch 114 to connect one or more devices on the bus 112, including the processor complex 108, a memory system 110, and a bus host adaptor 116 to extend the bus interface over an external bus interface cable 118 to the storage system 102. Additional bus interface technology to extend the bus interface may be utilized, including PCIe extender cables or components, such as a distributed PCIe switch, to allow PCIe over Ethernet, such as with the ExpEther technology.

A "second channel" to connect the host 100 and storage system 102 may use a network host adaptor 120, connected to the bus 112, that connects to a separate network 122 over which the host 100 and storage system 102 additionally communicate. The first channel through the bus interface may comprise a faster access channel than the second channel using the network 122 interface via the network host adaptor 120.

The storage system 102 includes a bus interface comprising a bus 124a, 124b, a bus switch 126 to connect to endpoint devices on the bus 124a, 124b, and a bus host adaptor 128 to connect to the external bus interface cable 118 to allow communication over the bus interface to the host 100 over the first channel. The storage system 102 includes an Input/Output bay 130 having the bus host adaptor 128, one or more device adaptors 132 to connect to the storage devices 104, and one or more network host adaptors 134 to connect to the network 122 and host systems.

The storage system 102 includes a processor complex 136 of one or more processor devices and a memory 138 having a cache 140 to cache tracks accessed by the connected hosts 100. The memory 138 includes a write access manager 142 to manage write requests to the cache 140, a storage manager 144 to manage access requests from processes in the hosts 100 and storage system 102 for tracks in the storage 104, and a cache manager 145 to manage requests to tracks in the cache 140. The devices 136, 138, 128, 132, and 134 connect over the bus interface implemented in the bus lanes 124a, 124b and bus switch 126.

The write access cache manager 142 prefetches cache resources, including metadata and other resources, in the cache 140 for a defined write set for which host write requests are expected on the first channel so that such write requests may be completed fast with low latency.

A track may comprise any unit of data configured in the storage 104, such as a track, Logical Block Address (LBA), etc., which is part of a larger grouping of tracks, such as a volume, logical device, etc.

The write access manager 142 and/or cache manager 145 maintain cache management information 146 in the memory 138 to manage read (unmodified) and write (modified) tracks in the cache 140. The cache management information 146 may include a track index 148 providing an index of tracks in the cache 140 to cache control blocks in a control block directory 150; and a Least Recently Used (LRU) list 152 for tracks in the cache 140. The control block directory 150 includes the cache control blocks, where there is one cache control block for each track in the cache 140 providing metadata on the track in the cache 140. The track index 148 associates tracks with the cache control blocks providing information on the tracks in the cache 140. Upon determining that the cache LRU list 152 is full or has reached a threshold level, tracks are demoted from the LRU list 152 to make room for more tracks to stage into the cache 140 from the storage 104.

The cache management information 146 may further includes write set information 200 of a write set of tracks established by the host 100 for tracks to write on the first channel. The write access manager 140 may prefetch cache resources for tracks in the write set in advance of receiving write transactions. The host 100 may establish multiple write sets for multiple ranges of tracks for which track resources will be allocated in anticipation of multiple streams of sequential write transactions toward the different ranges of tracks.

The host operating system 111 may establish a write set 200 for a range of tracks 204 in advance of sending write requests for sequential write transactions to have the write access manager 142 pre-allocate cache resources for the write set in anticipation of the sequential write transactions that will likely soon be directed to those tracks indicated in the write set. These pre-allocated cache resources reduce the latency of processing the sequential write requests when they are eventually received. Further, by allocating cache resources for a limited (fixed number) of a first subset of tracks within the write set, cache resources are held for only those tracks most likely to be written as part of a sequential write stream. Further, the number of tracks for which cache resources are held is limited to allow those cache resources to be available for access by other processes in the host operating system 111 or other connected hosts 100.

The write access manager 142 maintains an unexpected released track list 500 having information on track access reasons for access requests from internal processes 154 or external processes that resulted in the release of prefetched cache resources for the track in a write set 200 held for write requests to tracks in the write set sent on the first channel. The process 154 requesting access to a track may comprise a copy service, such as copying consistency groups of tracks, a destage/stage operation, an operation causing a quiesce to the volume including the tracks in the write set, etc. The unexpected released track list 500 may have a sufficient number of entries to be large enough to avoid entries from being overwritten in a short time and to provide sufficient details on track accesses resulting in the release of prefetched cache resources to allow in-depth debugging on the cause of the unexpected release of prefetched cache resources for tracks.

A cache resource that is held and accessed for tracks in the range of tracks 302 may comprise a segment in cache 140 to use for the track to write, a segment in a non-volatile storage if a copy of write tracks is to be stored in a non-volatile storage in a same or different cluster, track metadata for the track, as well as other types of cache resources needed to process a write transaction toward the track.

In certain embodiments, there may be multiple hosts 100 that connect to the storage system 102 over the first and second channels to access tracks in the storage devices 104. In such case, the storage system 102 would have at least one bus host adaptor 128 to connect to the bus interface 118 of each connected host 100 and one or more network host adaptors 134 to connect to the network host adaptors 120 on the hosts 100.

In one embodiment, the bus interfaces 112, 114, 116, 118, 124*a*, 124*b*, 126, and 128 may comprise a Peripheral Component Interconnect Express (PCIe) bus interface technology. In alternative embodiments, the bus interfaces 112, 114, 116, 118, 124*a*, 124*b*, 126, and 128 may utilize suitable bus interface technology other than PCIe. The bus host adaptors 116 and 128 may comprise PCIe host adaptors that provide the interface to connect to the PCIe cable 118. The network 122 may comprise a Storage Area Network (SAN), a Local Area Network (LAN), a Wide Area Network (WAN), Fibre Connection (FICON®), the Internet, an Intranet, etc., and the network host adaptors 120, 134 provide the network 122 connections between the hosts 100 and storage system 102. (FICON is a registered trademark of International Business Machines Corporation throughout the world.

The storage system 102 may comprise a storage system, also known as a control unit and storage controller, such as the International Business Machines Corporation (IBM®) DS8000® and DS8880 storage systems, or storage controllers and storage systems from other vendors. (IBM and DS8000 are trademarks of International Business Machines Corporation throughout the world). The host operating system 111 may comprise an operating system such as Z Systems Operating System (Z/OS®) from International Business Machines Corporation ("IBM") or other operating systems known in the art. (Z/OS is a registered trademark of IBM throughout the world).

The storage devices 104 in the disk enclosure 106 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STT-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 104 in the disk enclosure 106 may comprise heterogeneous storage devices from different vendors and different types of storage devices, such as a first type of storage devices, e.g., hard disk drives, that have a slower data transfer rate than a second type of storage devices, e.g., SSDs.

FIG. 2 illustrates an embodiment of an instance of write set information 200, for an established write set to receive write requests on the first channel, including a write set identifier (ID) 202 providing a unique identifier of a write set; a range of tracks 204 to which sequential write transactions on the first channel are expected and for which cache resources should be accessed in advance of the sequential write transactions; a track access list 300 indicating for each track in the range of tracks 204 whether the cache resources are being held for the track and whether the track was written since receiving the establish write set 200*k*; and a prefetch cursor 206 indicating a track in the range of tracks 302 from which cache resources should start being allocated for sequential write transactions in the write set 202.

In certain embodiments, the prefetch cursor 206 may be set during regular processing to point at the track the write access manager 142 anticipates the host 100 to be writing (if actively writing) or to be writing next (if not actively writing). The prefetch cursor 206 points to where the write access manager 142 determines the host 100 is in their processing.

FIG. 3 illustrates an embodiment of a track access list entry 300$_i$ in the track access list 300 indicating a track identifier (ID) 302; a cache resources held flag 304 indicating whether cache resources are being held for the track 302 and a track written flag 306 indicating whether the track 302 was written since the write set 202 was established.

FIG. 4 illustrates an embodiment of a second channel write request 400 received on the second channel from the host 100, and includes: a write operation code 402; a define extent range 404 of a subset of tracks in a write set 408 to which the following one or more sequential write transactions 406 will be directed; and a retry on first channel flag 410 indicating whether the write transactions 406 in the second channel write request 400 will be subsequently retried on the faster first channel.

FIG. 5 illustrates an embodiment of an entry 500$_i$ in the unexpected released track list 500 and includes: a track 502 identifying the accessed track for which prefetched cache resources were released; a volume 504 including the track; a write set 506 in which the track is included for first channel writes; and a track access reason 508 indicating a reason the process 154 or another process accessed the track. A track access reason may indicate a quiesce of the volume, a read or write to the track on the second channel, a read to the track, etc. Track access reasons can include any reasons that can assist the host 100, process or a user to debug fails of writes on the first channel or allow the host 100 to adjust operations to reduce the cause of the track access reasons resulting in the unexpected release of prefetched case resources.

Figure 6:
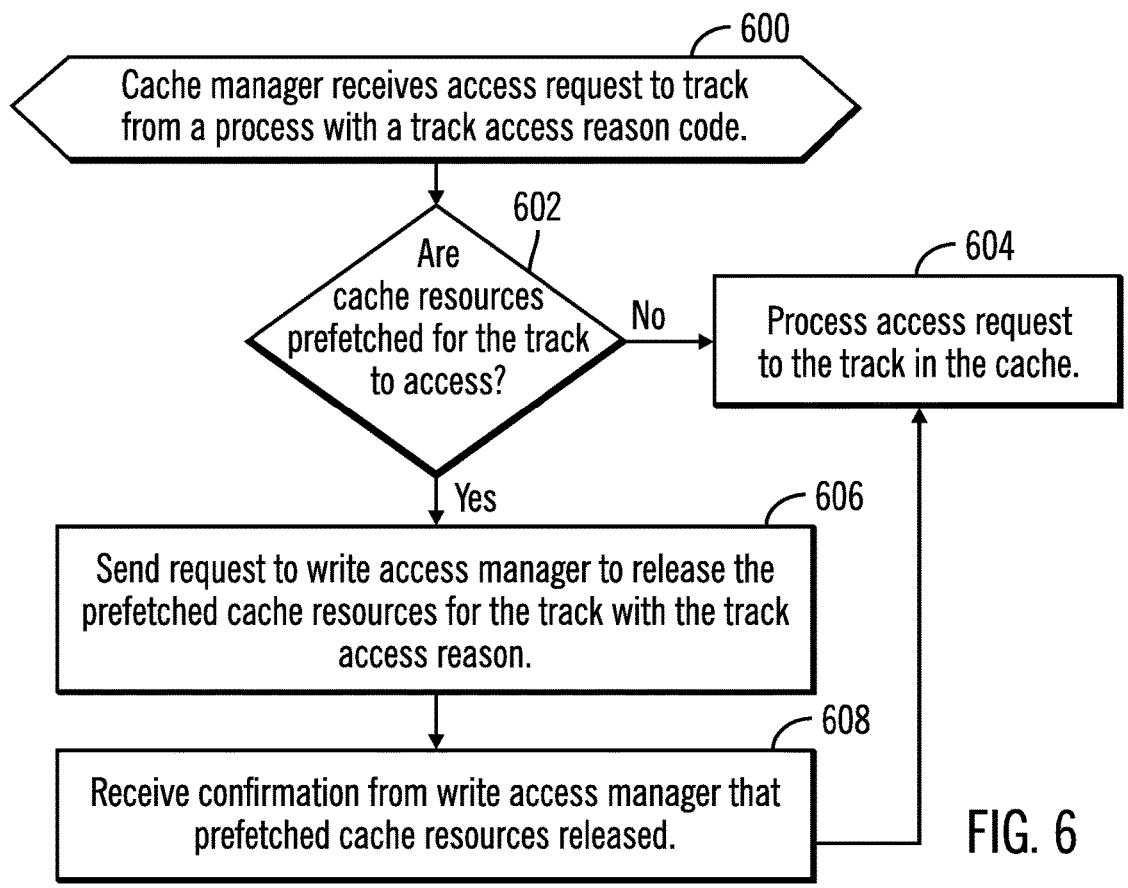
FIG. 6 illustrates an embodiment of operations to process a request to access a track for which a track access reason code is provided.

FIG. 6 illustrates an embodiment of operations performed by the cache manager 145 to process a request to a track, such as a first request, from a process 154 or other external process with a track access reason code. The track access reason code may be maintained in a task control block (TCB) or other task management operation implementing the process 154. Upon receiving (at block 600) the access request (first request) to the track, if (at block 602) there are no cache resources prefetched for the track to access, such as being held for a write request on the first channel, or second request, then the access request to the track in cache 140 is processed (at block 604). If (at block 602) there are prefetched cache resources held for the track, then the cache manager 145 sends (at block 606) a request to the write access manager 142 to release the prefetched cache resources for the track with the track access reason the process 154 provides for the first request. Upon receiving (at block 608) confirmation from the write access manager 142 that the prefetched cache resources are released, control proceeds to block 604 to allow the first request from the process 154 to complete.

Figure 7:
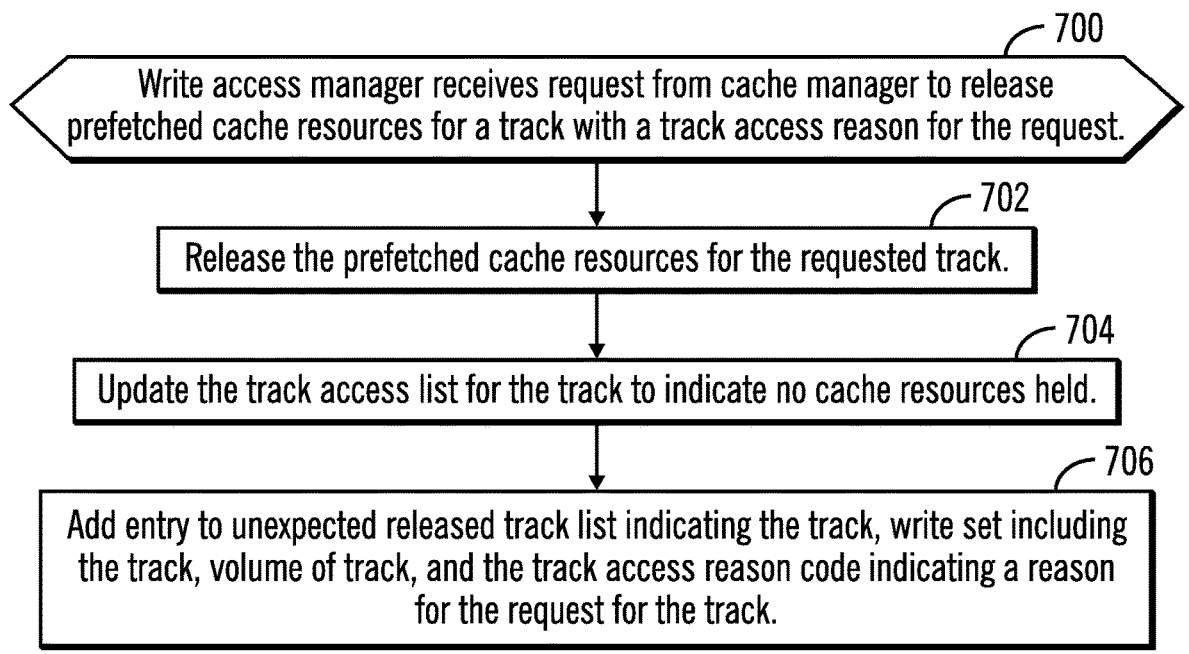
FIG. 7 illustrates an embodiment of operations to process a request to release prefetched cache resources for a track which includes a track access reason for the request.

FIG. 7 illustrates an embodiment of operations performed by the write access manager 142 to process a request from the cache manager 145 to release prefetched cache resources with a track access reason for the request. Upon receiving (at block 700) the request to release prefetched cache resources, the write access manager 142 releases (at block 702) the prefetched cache resources for the requested track. The track access list entry $300_i$ for the requested track in the track access list 300 is updated (at block 704) to indicate no cache resources are held 304. The unexpected released track list 500 is updated (at block 706) to include an entry $500_i$ indicating the requested track 502, volume 504 of track, the write set 506 including the track, and the track access reason code 508 indicating a reason for the request for the track.

With the embodiments of FIGS. 6 and 7, the write access manager 142 has the capability to track reasons that other processes 154 requested a track in a write set for which prefetched cache resources were held and caused those prefetched cache resources to be released, resulting in a fail of a subsequent write to the track expected on the fast first channel. The host 100 or a user may use the track access reasons 508, provided for the release of prefetched cache resources that would have caused first channel write requests to fail, to debug and troubleshoot the reason for the unexpected release of prefetched cache resources before the expected writes are received on the first channel.

Figure 8:
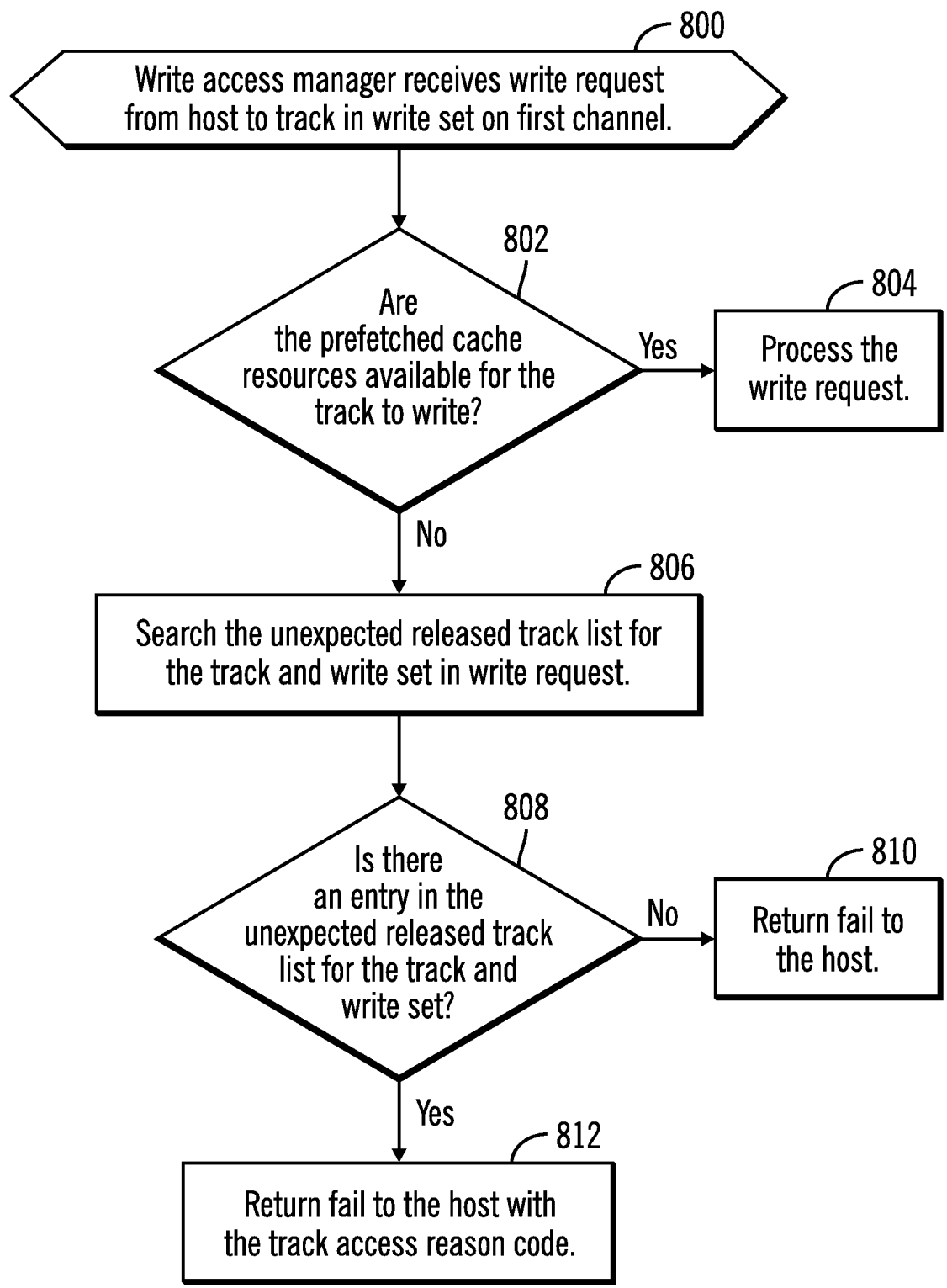
FIG. 8 illustrates an embodiment of operations to process a write request received on a first channel to write to a track in a write set.

FIG. 8 illustrates an embodiment of operations performed by the write access manager 142 to process a write to a track in a write set received on the first channel, a second request with respect to the first request from the process 154. Upon receiving (at block 800) the write request on the first channel, the write access manager 142 determines (at block 802) whether prefetched cache resources are available for the track to write. If so, the write request on the first channel is processed (at block 804). If (at block 802) there are no prefetched cache resources available for the write, then the write access manager 142 searches (at block 806) the unexpected released track list 500 for an entry $500_i$ having the requested track 502 and the write set 504 including the track. If (at block 808) no entry $500_i$ is found in the list 500, then fail is returned (at block 810) to the host without any track access reason 508 to assist the host or other process in addressing or troubleshooting the fail. If (at block 808) there is an entry $500_i$ for the track and write set in the list, then the write access manager 142 returns (at block 812) fail with the track access reason 508 in the located entry $500_i$.

In one embodiment, the process resulting in the release of the prefetched cache resources may comprise a host 100 request on the second channel for the track. In such case, the track access reason code may indicate second channel track access. For instance, if there are errors on the first channel link that cause a host timeout, then the host may retry writing the track over the second channel link. In such case, the write access manager 142 may indicate the track access reason code as a second channel write. Analysis of storage system 102 dumps may reveal that the host retried a write on the second channel that failed and the first channel link may need to be diagnosed as a possible cause of this failure.

The track access reason code may also indicate that the unexpected release of prefetched cache resources is due to a quiesce of the volume including the track caused by a copy service forming consistency groups of tracks, including the requested track. This information will allow the host or other user to diagnose the cause of a subsequent failure of a write on the first channel as resulting from copy services.

In certain processes, reads may closely follow writes on the first channel to read data, such as logged data. If the reads follow too closely to the writes, then contention for track access can cause the release of prefetched cache resources for tracks that are held for expected first channel writes. The host 100 upon receiving failures to first channel write requests including the track access reason code indicating a read of the track, may then throttle the reads to avoid contention with the expected writes to the tracks.

In one embodiment, where the second channel comprises a Fibre Connection (FICON®) link, which is the International Business Machines Corporation's (IBM) proprietary name for the ANSI FC-SB-3 Single-Byte Command Code Sets-3 Mapping Protocol for Fibre Channel (FC), the first channel comprises the IBM zHyperLink, and the host operating system 111 comprises Z/OS®, then the host 100 may retry a failed zHyperLink (first channel) write via the FICON interface (second channel).

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
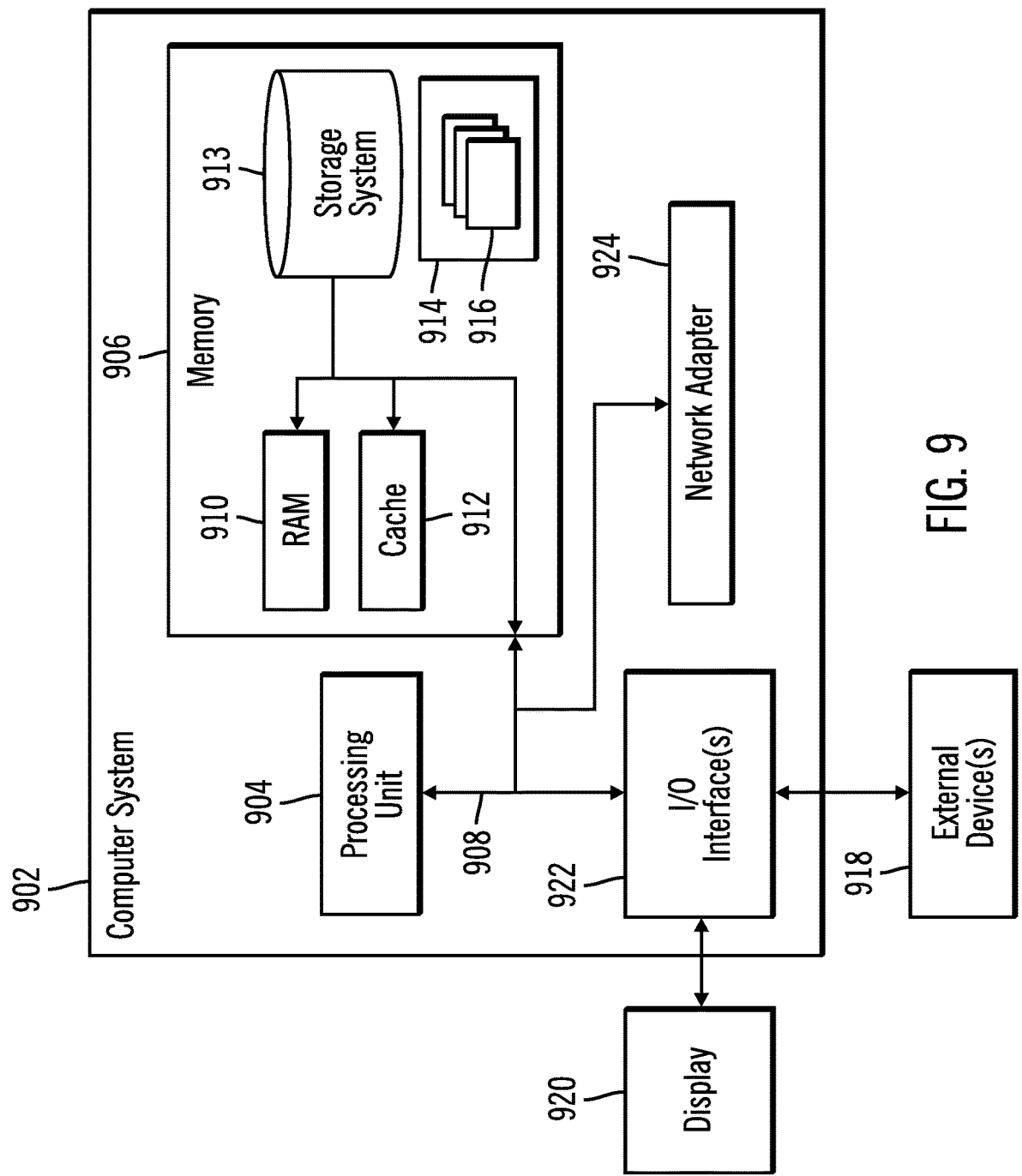
FIG. 9 illustrates an embodiment of a computer architecture used with described embodiments.

The computational components of FIG. 1, including the host 100 and storage system 102 may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing access requests to tracks in storage cached in a cache, the computer program product comprising a computer readable storage medium having computer readable program code embodied therein that is executable to perform operations, the operations comprising:
   receiving a first request for a track from a process for which prefetched cache resources to the cache are held for a second request for the track that is expected, wherein a track access reason is provided for the first request specifying a reason for the first request;
   releasing the prefetched cache resources before the second request to the track is received; and
   indicating in an unexpected released track list the track and the track access reason for the first request.

2. The computer program product of claim 1, wherein the second request comprises a write to the track in a write set of tracks to write, wherein the write set including the track is indicated with the track in the unexpected released track list.

3. The computer program product of claim 1, wherein the operations further comprise:
   receiving the second request to the track;
   determining that the prefetched cache resources are no longer available for the second request;
   searching the unexpected released track list for the track in response to determining that the prefetched cache resources are no longer held; and
   returning the track access reason for the first request in the unexpected released track list with a fail for the second request.

4. The computer program product of claim 1, wherein the process generating the first request for the track comprises an internal process in a storage system having the cache, wherein the operations further comprise:
   receiving, by a cache manager managing access to the cache in the storage system, the first request from the internal process; and
   sending, by the cache manager, a request to release the prefetch cache resources and the track access reason in response to determining that the prefetch cache resources are held for a write access manager that requested the prefetch cache resources for a write to the track as part of sequential writes to a write set of tracks, wherein the write access manager indicates the track and the track access reason in the unexpected released track list.

5. The computer program product of claim 1, wherein the process initiating the first request comprises a copy service forming a consistency group including the track that causes a quiesce to a volume including the track, wherein the track access reason indicates a write miss due to a quiesce of the volume.

6. The computer program product of claim 1, wherein the process initiating the first request comprises a read of the track triggered by a write to a track preceding the track requested by the second request, wherein the read requires release of the prefetched cache resources, wherein the operations further comprise:
 returning fail to the second request including the track access reason indicating the prefetched cache resources were released to a read to the track; and
 throttling read requests to tracks for which cache resources are prefetched in response to receiving the track access reason indicating the prefetched cache resources were released to the read to the track to avoid read content conflicts to tracks to write.

7. The computer program product of claim 1, wherein the second request comprises a first write request received on a first channel from a host, wherein the host uses the track access reason to determine whether to retry the first write request as a second write request to the track on a second channel in response to receiving a fail to the first write request on the first channel.

8. The computer program product of claim 7, wherein the first request for the track that causes the prefetched cache resources to be released comprises a write request to the track on the second channel, wherein the track access reason indicates a second channel write request as a reason for the returned fail to the host, wherein the host uses the track access reason to determine link failures on the first channel.

9. A system for processing access requests to tracks in storage, comprising:
 a processor;
 a cache to cache tracks in the storage; and
 a computer readable storage medium having computer readable program code embodied therein that when executed by the processor performs operations, the operations comprising:
  receiving a first request for a track from a process for which prefetched cache resources to the cache are held for a second request for the track that is expected, wherein a track access reason is provided for the first request specifying a reason for the first request;
  releasing the prefetched cache resources before the second request to the track is received; and
  indicating in an unexpected released track list the track and the track access reason for the first request.

10. The system of claim 9, wherein the second request comprises a write to the track in a write set of tracks to write, wherein the write set including the track is indicated with the track in the unexpected released track list.

11. The system of claim 9, wherein the operations further comprise:
 receiving the second request to the track;
 determining that the prefetched cache resources are no longer available for the second request;
 searching the unexpected released track list for the track in response to determining that the prefetched cache resources are no longer held; and
 returning the track access reason for the first request in the unexpected released track list with a fail for the second request.

12. The system of claim 9, wherein the process generating the first request for the track comprises an internal process in a storage system having the cache, wherein the operations further comprise:
 receiving, by a cache manager managing access to the cache in the storage system, the first request from the internal process; and
 sending, by the cache manager, a request to release the prefetch cache resources and the track access reason in response to determining that the prefetch cache resources are held for a write access manager that requested the prefetch cache resources for a write to the track as part of sequential writes to a write set of tracks, wherein the write access manager indicates the track and the track access reason in the unexpected released track list.

13. The system of claim 9, wherein the second request comprises a first write request received on a first channel from a host, wherein the host uses the track access reason to determine whether to retry the first write request as a second write request to the track on a second channel in response to receiving a fail to the first write request on the first channel.

14. The system of claim 13, wherein the first request for the track that causes the prefetched cache resources to be released comprises a write request to the track on the second channel, wherein the track access reason indicates a second channel write request as a reason for the returned fail to the host, wherein the host uses the track access reason to determine link failures on the first channel.

15. A method for processing access requests to tracks in storage cached in a cache, comprising:
 receiving a first request for a track from a process for which prefetched cache resources to the cache are held for a second request for the track that is expected, wherein a track access reason is provided for the first request specifying a reason for the first request;
 releasing the prefetched cache resources before the second request to the track is received; and
 indicating in an unexpected released track list the track and the track access reason for the first request.

16. The method of claim 15, wherein the second request comprises a write to the track in a write set of tracks to write, wherein the write set including the track is indicated with the track in the unexpected released track list.

17. The method of claim 15, further comprising:
 receiving the second request to the track;
 determining that the prefetched cache resources are no longer available for the second request;
 searching the unexpected released track list for the track in response to determining that the prefetched cache resources are no longer held; and
 returning the track access reason for the first request in the unexpected released track list with a fail for the second request.

18. The method of claim 15, wherein the process generating the first request for the track comprises an internal process in a storage system having the cache, further comprising:
 receiving, by a cache manager managing access to the cache in the storage system, the first request from the internal process; and
 sending, by the cache manager, a request to release the prefetch cache resources and the track access reason in response to determining that the prefetch cache resources are held for a write access manager that requested the prefetch cache resources for a write to the track as part of sequential writes to a write set of tracks, wherein the write access manager indicates the track and the track access reason in the unexpected released track list.

19. The method of claim 15, wherein the second request comprises a first write request received on a first channel from a host, wherein the host uses the track access reason to determine whether to retry the first write request as a second write request to the track on a second channel in response to receiving a fail to the first write request on the first channel.

20. The method of claim 19, wherein the first request for the track that causes the prefetched cache resources to be released comprises a write request to the track on the second channel, wherein the track access reason indicates a second channel write request as a reason for the returned fail to the host, wherein the host uses the track access reason to determine link failures on the first channel.

\* \* \* \* \*